US008013822B2

(12) United States Patent
Nose et al.

(10) Patent No.: US 8,013,822 B2
(45) Date of Patent: Sep. 6, 2011

(54) METHOD OF DRIVING DISPLAY ELEMENT

(75) Inventors: Masaki Nose, Kawasaki (JP); Tomohisa Shingai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 11/861,771

(22) Filed: Sep. 26, 2007

(65) Prior Publication Data
US 2008/0024472 A1 Jan. 31, 2008

Related U.S. Application Data

(63) Continuation of application No. PCT/JP2005/005798, filed on Mar. 29, 2005.

(51) Int. Cl.
*G09G 3/36* (2006.01)
(52) U.S. Cl. .......................................... 345/87; 345/99
(58) Field of Classification Search ............ 345/87–100, 345/204–214
See application file for complete search history.

(56) References Cited

U.S. PATENT DOCUMENTS

| 5,929,831 | A | * | 7/1999 | Aratani et al. | 345/97 |
| 6,744,418 | B2 | * | 6/2004 | Hiji et al. | 345/94 |
| 7,119,771 | B2 | * | 10/2006 | Yoneda et al. | 345/87 |
| 7,138,973 | B2 | * | 11/2006 | Okafuji et al. | 345/98 |
| 7,307,608 | B2 | * | 12/2007 | Stephenson et al. | 345/87 |
| 7,389,476 | B2 | * | 6/2008 | Senda et al. | 715/768 |
| 2003/0085858 | A1 | | 5/2003 | Okafuji et al. | |
| 2006/0061520 | A1 | | 3/2006 | Speirs et al. | |
| 2006/0187185 | A1 | * | 8/2006 | Yoshinaga et al. | 345/107 |

FOREIGN PATENT DOCUMENTS

| JP | 2000-147465 A | 5/2000 |
| JP | 2000-147466 A | 5/2000 |
| JP | 2000-171837 A | 6/2000 |
| JP | 2000-180887 A | 6/2000 |
| JP | 2000-194005 A | 7/2000 |
| JP | 2000-284758 A | 10/2000 |
| JP | 2002-297112 A | 10/2002 |
| JP | 2003-140114 A | 5/2003 |
| JP | 2003-228044 A | 8/2003 |
| WO | 2004/001708 A2 | 12/2003 |

OTHER PUBLICATIONS

European Search Report dated Jan. 22, 2010, issued in corresponding European Patent Application No. 05727406.0.
Communication pursuant to Article 94(3) EPC dated May 3, 2010, issued in corresponding European Patent Application No. 05727406.0.
International Search Report of PCT/JP2005/005798, date of mailing May 17, 2005.
Japanese Office Action dated Sep. 7, 2010, issued in corresponding Japanese Patent Application No. 2007-512364.

* cited by examiner

*Primary Examiner* — Nitin Patel
(74) *Attorney, Agent, or Firm* — Westerman, Hattori, Daniels & Adrian, LLP

(57) ABSTRACT

In a display element using cholesteric liquid crystal, to enable a high-speed partial screen rewrite, a region not to be partially rewritten is scanned in high-speed mode within the tolerance of crosstalk of the liquid crystal, and a region to be partially rewritten is partially rewritten by being scanned at a normal speed within a rewritable range with an inexpensive universal driver. As a result, a high-speed rewrite only to an arbitrary particular region can be made even with an inexpensive universal driver IC.

19 Claims, 11 Drawing Sheets

|  | DATA SIGNAL | AC SIGNAL | DRIVER OUTPUT VOLTAGE |
|---|---|---|---|
| DATA (SEGMENT MODE) | High | High | V0 |
|  |  | Low | V5 |
|  | Low | High | V21 |
|  |  | Low | V34 |
| SCAN (COMMON MODE) | High | High | V5 |
|  |  | Low | V0 |
|  | Low | High | V21 |
|  |  | Low | V34 |

SEGMENT MODE: ARBITRARY LINE SELECTABLE
COMMON MODE: SCANNING ALL LINES (ARBITRARY LINE NOT SELECTABLE)

FIG. 2A            PRIOR ART

| SEG | | |
|---|---|---|
| | V0 | 32 |
| | V21 | 24 |
| | V34 | 8 |
| | V5 | 0 |

| COM | | |
|---|---|---|
| | V0 | 32 |
| | V21 | 28 |
| | V34 | 4 |
| | V5 | 0 |

$V0 \geqq V21 \geqq V34 \geqq V5$

FIG. 2B         PRIOR ART

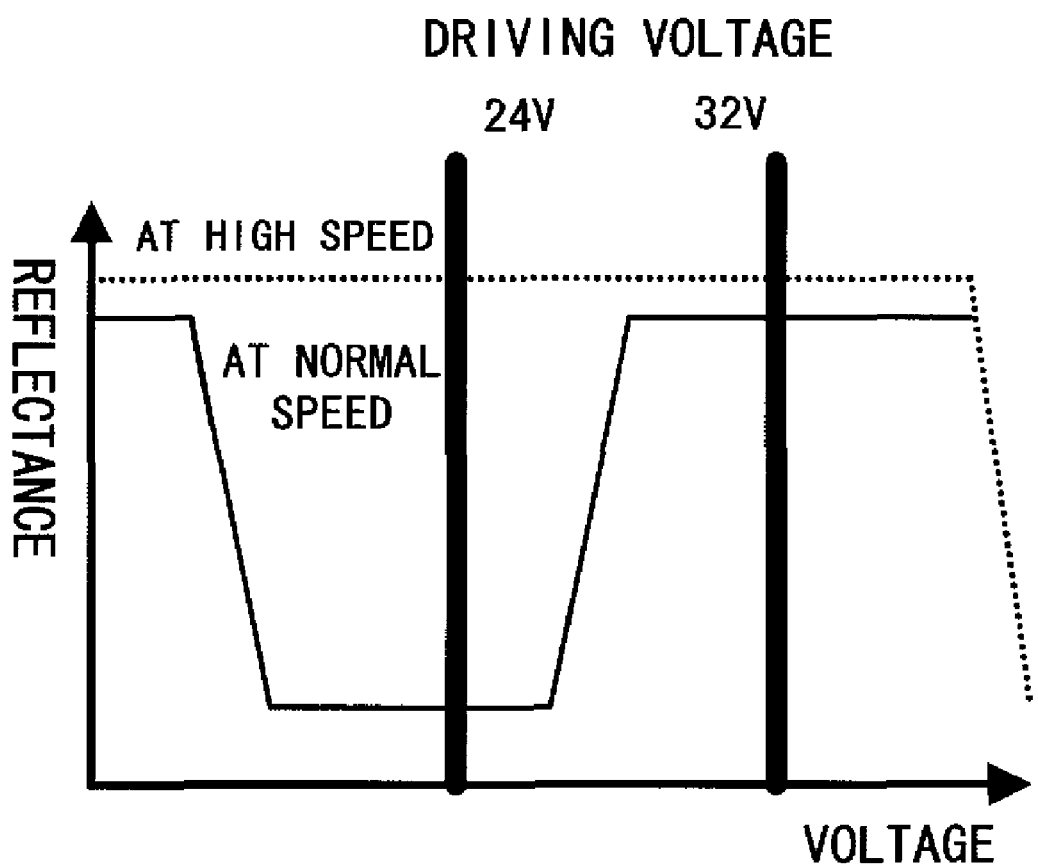
F I G. 5

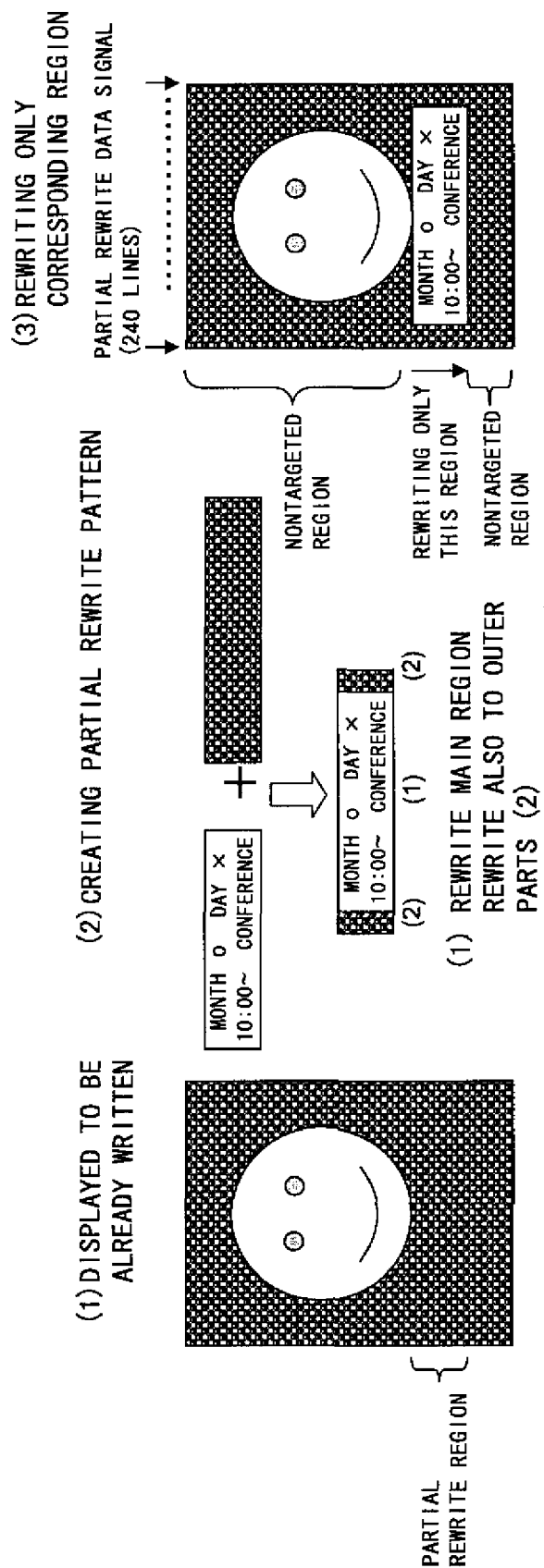
F I G. 7

METHOD OF DRIVING DISPLAY ELEMENT

CROSS REFERENCE TO RELATED APPLICATION

This application is a continuation of international PCT application No. PCT/JP2005/005798 filed on Mar. 29, 2005.

BACKGROUND OF THE INVENTION

1. Field of the Invention

The present invention relates to a method of driving a display element that uses cholesteric liquid crystals, and more particularly, to a method of driving a liquid crystal display element by which a partial screen can be rewritten at high speed.

2. Description of the Related Art

In recent years, electronic paper has been vigorously developed by companies and universities. Electronic paper can be applied to various portable devices including electronic books, sub-displays in mobile terminals, and display units in IC cards.

One effective way to realize electronic paper is to utilize cholesteric liquid crystals.

A cholesteric liquid crystal has excellent characteristics, including an ability to hold a display state semi-permanently (image memory characteristic) and to display images clearly in full color at a high contrast and at a high resolution. The cholesteric liquid crystal is also called a chiral nematic liquid crystal because the cholesteric liquid crystal is a nematic liquid crystal whose cholesteric phase is formed, and the cholesteric phase where molecules of the nematic liquid crystal are tied up in a helix is formed by adding a relatively large quantity (several tens of percent) of chiral addition (also called chiral material) to the nematic liquid crystal.

Hereinafter, the principles of the display and of the driving of cholesteric liquid crystals are explained.

A display using cholesteric liquid crystals is controlled in accordance with the oriented state of the molecules in the cholesteric liquid crystals. As shown in the graph of a reflection factor in FIG. 1A, cholesteric liquid crystals have a planar (P) state, where the incident light is reflected, and a focal conic (FC) state, where the incident light penetrates, and these states are stable even without an electric field. In the planar state, light having a wavelength corresponding to the helical pitch over the liquid crystal molecules is reflected. The wavelength $\lambda$ that causes the maximum reflection is expressed by the equation below in which n is an average refraction index, and p is a helical pitch.

$$\lambda = n \cdot p$$

In contrast, the reflection band $\Delta\lambda$ increases as the refraction index anisotropy $\Delta n$ increases.

Accordingly, by suitably selecting the average refraction index n and helical pitch p, it is possible to display a color having the wavelength $\lambda$, in the planar state.

Also, by providing a light absorption layer separately from a liquid crystal layer, black can be displayed in the focal conic state.

Next, an example of driving cholesteric liquid crystals is explained.

When an intense electric field is applied to a cholesteric liquid crystal, the helical structure of the liquid crystal molecules are unwound completely and their state becomes homeotropic, with all the molecules oriented along the direction of the electric field. Next, when the electric field that has caused the homeotropic state suddenly becomes zero, the helical axis of the liquid crystal becomes perpendicular to the electrode, and the planar state is caused in which light is selectively reflected in accordance with the helical pitch. In contrast, when an electric field that is sufficiently weak so as not to unwind the helical structure is removed, or when an intense electric field is gradually removed after being applied, the helical axis of the liquid crystal becomes parallel to the electrode, and the focal conic state is caused in which the incident light penetrates. Also, when an intermediately intense electric field is applied and this electric field is removed suddenly, both the planar state and the focal conic state are caused and a display of halftones is possible.

By using this phenomenon, information can be displayed.

The above described voltage response characteristic is summarized as follows with reference to FIG. 1 explaining the response characteristic of the cholesteric liquid crystal.

If the initial state (0V) is the planar state (high reflectance), a driving voltage value enters a driving band for the focal conic state (low reflectance) when the pulse voltage is raised to a certain range (such as 24V), and the driving voltage value reenters a driving band for the planar state (high reflectance) when the pulse voltage is further raised (such as to 32V). If the initial state (0V) is the focal conic state, the driving voltage value gradually enters the driving band for the planar state as the pulse voltage is raised.

Here, voltage outputs of a marketed STN driver of two-valued output, which is applicable to cholestric liquid crystal, are described with reference to FIGS. 2A to 2C.

Since alternating current driving is essential for liquid crystal, two driving voltages used when an alternating current signal is High and Low must be initially set. Correspondences between the voltages (V0, V21, V34, V5) and the alternating current signal High or Low at that time are normally as shown in FIG. 2A for a data signal and a scan signal, and the magnitudes of the voltage outputs must be $V0 \geq V21 \geq V34 \geq V5$.

By way of example, for data fed in a segment mode, a voltage output is V0 if a data signal is High and its corresponding alternating current signal is High, or a voltage output is V5 if the data signal is High and its corresponding alternating current signal is Low, as shown in FIG. 2A.

In accordance with this, when cholestreric liquid crystal is driven, for example, in the segment mode, the voltages (V0, V21, V34, V5) are set to voltage values of (32, 24, 8, 0) respectively. Then, voltage waveforms shown in FIG. 2C are obtained.

Namely, to a line selected by scanning, a voltage 0→32V is applied like "ON scan" shown in FIG. 2C. In the meantime, a voltage 32→0V and a voltage 24→8V are applied respectively as ON data and OFF data from the data side. These voltages are combined, whereby, in the selected line, a potential difference of "ON scan-ON data" occurs in a pixel of ON display and a voltage of ±32V is applied, and a potential difference of "ON scan-OFF data" occurs in a pixel of OFF display, and a voltage of ±24 is applied.

Similarly, for all of pixels in a nonselected line, potential differences of "OFF scan-ON data", and "OFF scan-OFF data" occur, and ±4V is applied to all of them.

Accordingly, as understood from the voltage response characteristic shown in FIG. 1, crosstalk does not occur in a nonselected line, and a preceding display state (the planar state or the focal conic state) is held.

Incidentally, for electronic paper, which is an application field of a display element using cholesteric liquid crystal, a function to rewrite only a particular region within a display area (hereinafter referred to as a partial rewrite) is demanded. When a partial rewrite is made, other regions must hold a previously written state unchanged.

However, a marketed STN driver has the following problems. (1) Since the scan mode shifts all of lines without fail, ON/OFF voltage is applied also to a region, to which a partial rewrite is not made, in all cases. Namely, scanning cannot be made only for a particular region. Since all of lines are scanned after all, this poses a problem that a lot of time is required because an entire screen is rewritten by combining displayed image data and image data used for the partial rewrite in a processing unit. (2) Only a particular line can be scanned if both a scan side and a data side are driven in the segment mode. In that case, a largeness/smallness relationship of voltages like $V0 \geqq V21 \geqq V34 \geqq V5$ becomes a barrier, and a driving waveform obtained by combining the common mode and the segment mode cannot be realized, and crosstalk occurs in a nonselected pixel in all cases, so that a displayed image is lost.

In the meantime, the known partial rewrite methods for cholesteric liquid crystal recited in the following Patent Documents 1 to 5 use a customized driver the voltage output of which is made bipolar (plus and minus) and which is free from the above described voltage constraints.

Here, examples where the cholesteric liquid crystal is simply driven in accordance with the response characteristic of the liquid crystal shown in FIG. 1 tentatively with the bipolar driver free from the voltage constraints are shown in FIG. 3. In both of the examples 1 and 2, voltages of ON level and OFF level, which are shown in FIG. 2C, can be applied to pixels in a selected line. As described above, it becomes easy to select and drive only a partial rewrite region if the voltage constraints are not imposed.

However, since the driver is made bipolar, high voltage endurance and a complicated configuration of an LSI within the driver are required, leading to an increase in cost.

Namely, to partially rewrite a particular region of a display element using cholesteric liquid crystal, conventionally, both a scan driver and a data driver must drive in a mode (usually called a segment mode) for enabling the selection of an arbitrary line, and must be designed to have a special output voltage in order to prevent crosstalk. This is a large factor to increase the cost. With a universal STN driver, a partial rewrite cannot be made because a large amount of crosstalk occurs in the segment mode of both the scan driver and the data driver as described above. Even if part of a display is rewritten, an entire image must be updated. Accordingly, there is problem that a rewrite requires a lot of time.

Patent Document 1: Japanese Patent Application Publication No. 2000-147465
Patent Document 2: Japanese Patent Application Publication No. 2000-147466
Patent Document 3: Japanese Patent Application Publication No. 2000-171837
Patent Document 4: Japanese Patent Application Publication No. 2000-180887
Patent Document 5: Japanese Patent Application Publication No. 2000-194005

SUMMARY OF THE INVENTION

An object of the present invention is to enable a high-speed partial screen rewrite with an inexpensive universal driver in a display element using cholesteric liquid crystal.

To achieve this, a region not to be partially rewritten is scanned in a high-speed mode within the tolerance of crosstalk of the liquid crystal, and a region to be partially rewritten is scanned at a normal speed within a rewritable range, and partially rewritten.

As a result, a high-speed rewrite only to an arbitrary particular region can be made even with an inexpensive universal driver IC.

BRIEF DESCRIPTION OF DRAWINGS

FIG. 2A shows relationships between voltage outputs of a marketed universal STN driver and signal outputs in a segment mode and a common mode;
FIG. 2B exemplifies correspondences between the voltage outputs of the marketed universal STN driver and its voltage values when cholesteric liquid crystal is driven;
FIG. 5 shows a shift of a threshold value characteristic due to high-speed scanning;
FIG. 7 explains a method of rewriting only part of a region to be rewritten.

DESCRIPTION OF THE PREFERRED EMBODIMENTS

Figure 4:
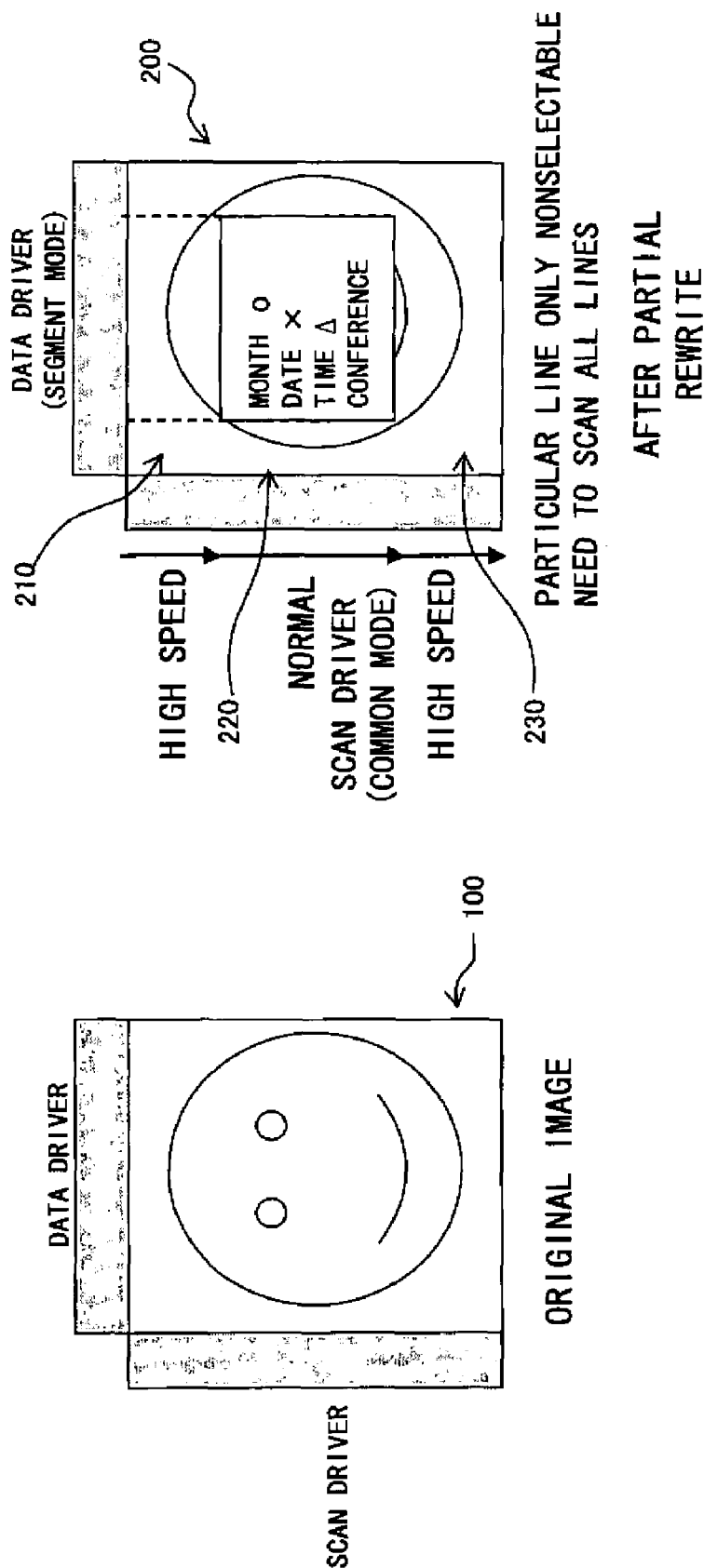
FIG. 4 explains the principle of the present invention.

FIG. 4 explains the principle of the present invention.

If a partial region 220 of an original image 100 is rewritten, and an image 200 after being partially rewritten is displayed, a region 210 not to be partially rewritten is scanned in high-speed mode, and a rewrite is made at a normal scanning speed when the region 220 to be partially rewritten is reached. After the rewrite region 220 has been scanned, the scanning reverts to the high-speed mode, and a remaining region 230 is scanned at high speed.

Figure 1:
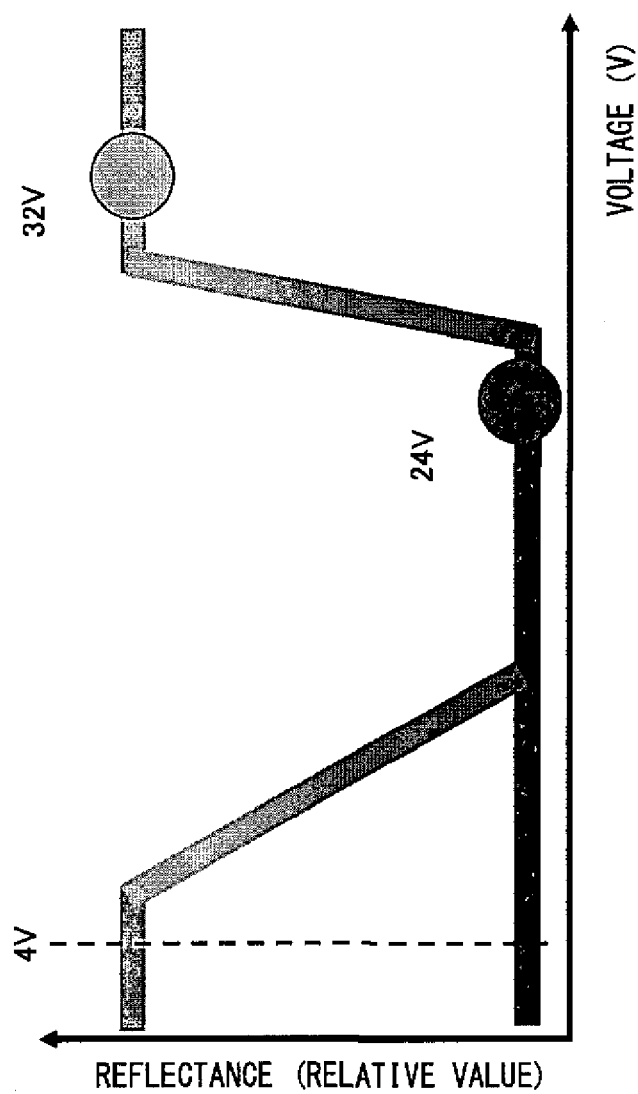
FIG. 1 explains the response characteristic of cholesteric liquid crystal.
Figure 2C:
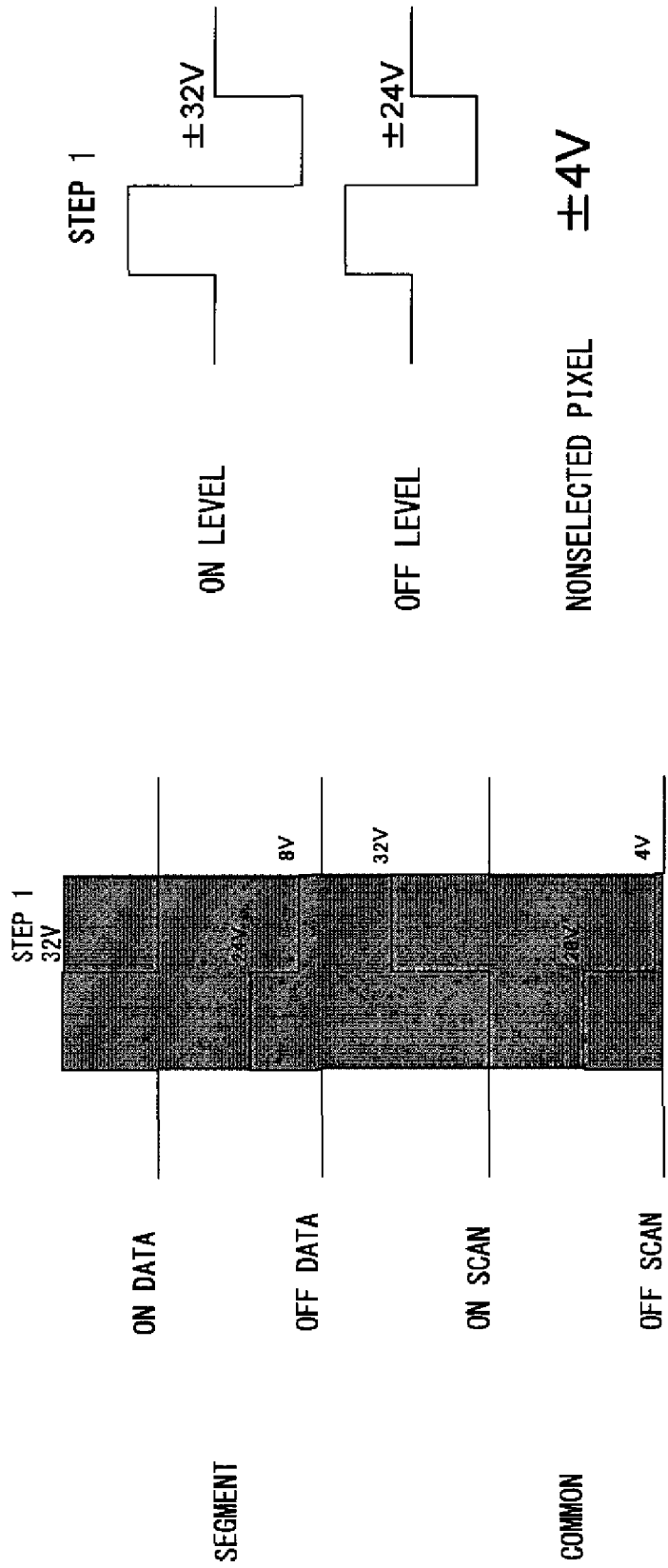
FIG. 2C shows data signals, scan signals and voltages applied to pixels.
Figure 3:
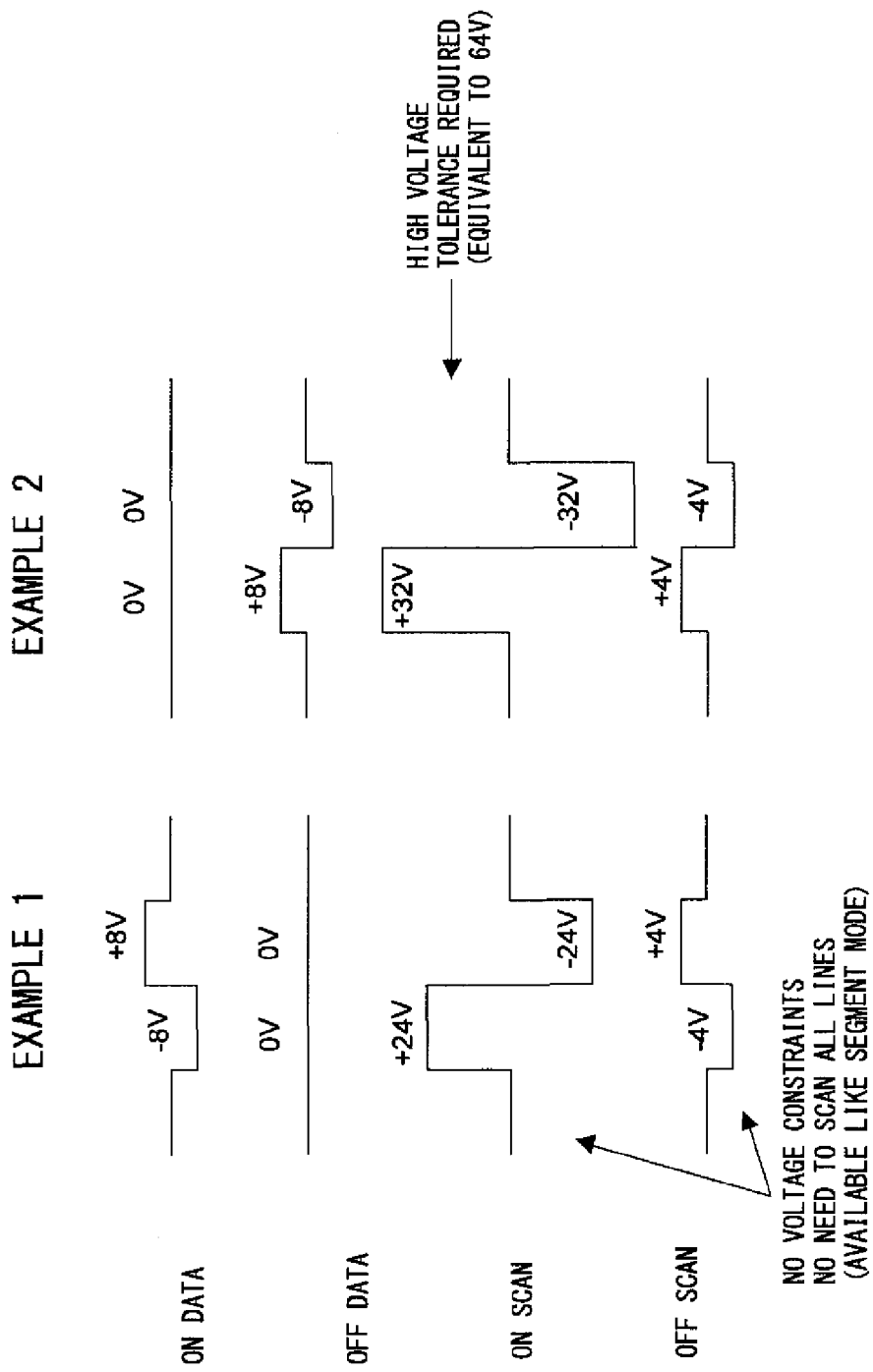
FIG. 3 shows examples where a display element is driven with a bipolar driver.

Also in the high-speed mode in the regions preceding and succeeding, the voltage of ±24V or ±32V, which is shown in FIG. 2C, is applied to each pixel. As shown in FIG. 5, the operating threshold value voltage of cholesteric liquid crystal significantly rises to higher than 32V due to the high-speed scanning. Therefore, the orientation state (display state) of the liquid crystal does not vary. Accordingly, as indicated by the image 200 after being partially rewritten, information about the opening of a conference can be displayed on the original image 100.

In FIG. 4, the example where part of the original image 100 is left in the region 220 to be partially rewritten is shown. However, the part of the original image 100 cannot be left only if the scanning speed is merely set to a normal speed. A process for leaving the part will be described later with reference to FIG. 7.

Figure 6:
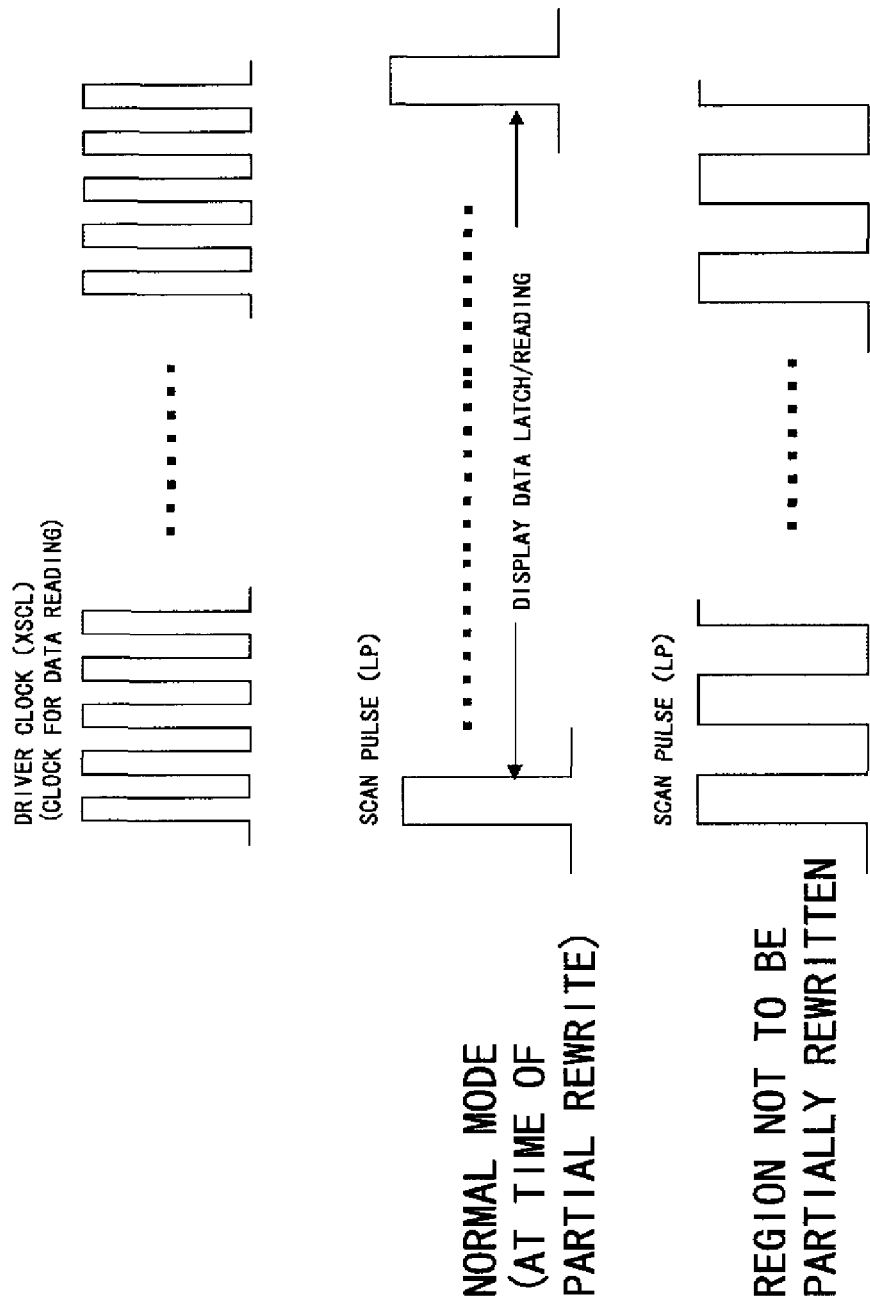
FIG. 6 shows a relationship between a driver clock and a scan pulse.

FIG. 6 shows a relationship between a driver clock which is a clock for data reading, and a scan pulse. Assuming that a bus width for inputting display data is 8 bits and the number of pixels per line is 320 bits, a scan pulse (LP) in the normal mode is generated every 40 clocks of the driver clock (XSCL). In the high-speed mode, a scan pulse (LP) the period of which is, for example, as high as a 2-divided driver clock (XSCL) as shown in FIG. 6 is used. In this case, scanning is made twenty times as fast as the speed in the normal mode. A shorter period of the scan pulse (LP) in the high-speed mode can prevent crosstalk more securely.

Additionally, although the scan pulse (LP) in the high-speed mode is fed regardless of data reading timing based on the driver clock (XSCL), a data write is not made in the high-speed mode. Therefore, this does not cause any inconvenience. Besides, image data fed to the driver IC may be arbitrary data in the high-speed mode.

The process for leaving the part of the original image in the partial rewrite region is described next with reference to FIG. 7. In that case, images are combined beforehand as shown in FIG. 7. Now, the partial region displayed to have been already rewritten shown in FIG. 7 is rewritten. If part of the rewrite region is left unchanged as a previous display, a partial rewrite pattern where the part to be actually rewritten in the original region is to be rewritten is created, and a data signal of the created partial rewrite pattern is fed when the partial rewrite region is scanned, whereby only the part of the region can be rewritten.

In the above described preferred embodiment, the same voltage as that at the time of a normal write is applied to each pixel in the regions preceding and succeeding in the high-speed scanning mode. In the meantime, all of output voltages of the driver may be also set to 0V while a region not to be partially rewritten is being scanned. In this case, several ms happen to be required until the output voltage of the driver is increased from 0V to a predetermined magnitude when the scanning shifts from the region not to be rewritten to the partial rewrite region. As a result, an edge can sometimes blur in the initial part of the partial rewrite if the scanning is usually performed.

Additionally, a waiting time of several ms, which are required until the output voltage increases to the predetermined magnitude, may be inserted. However, noise can occur in the display also in this case.

Therefore, it is preferable to set the voltage output to a predetermined magnitude for a region not to be partially rewritten.

With the process of the above described flow, a universal driver of two-valued output itself can be used, and a high-speed partial rewrite can be made without increasing the cost.

Figure 8:
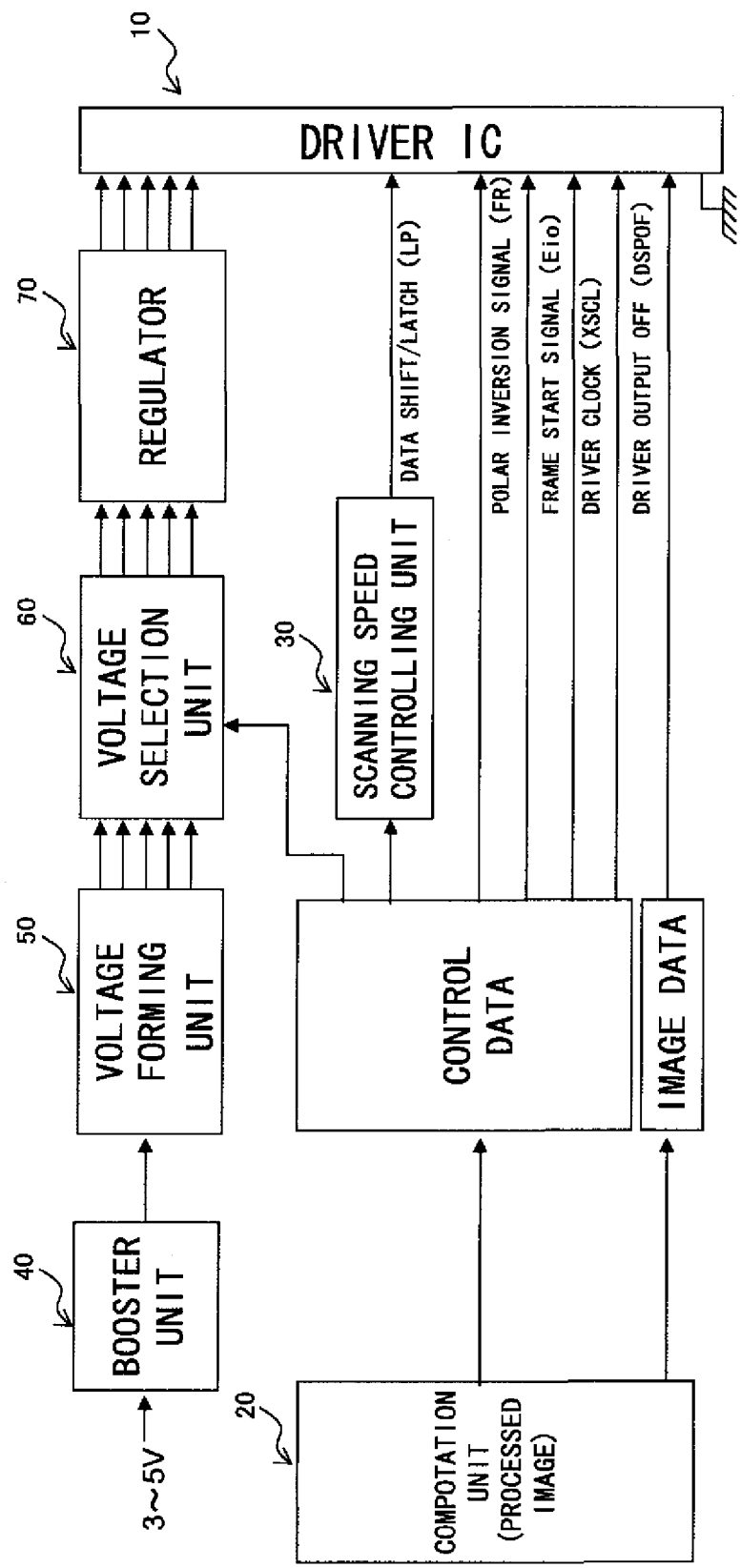
FIG. 8 exemplifies a block configuration of a driving circuit according to the present invention.

A block diagram exemplifying a driving circuit for implementing the display element driving method according to the present invention is shown in FIG. 8. A driver IC 10 includes a scan driver and a data driver. A computation unit 20 outputs image data, which is processed for a display and fed to the data driver, to the driver IC 10, and outputs various types of control data shown in this figure to the driver IC 10.

A data shift latch signal is a signal for performing a control for shifting a scan line to the next line, and a control for the latch of a data signal. The data shift latch signal is output to the driver IC 10 via a scanning speed controlling unit 30 because the high-speed mode is used in the partial rewrite process in the present invention. A polar inversion signal is a signal for inverting the output of the driver IC 10 that is unipolar. A frame start signal is a synchronization signal when a display screen starts to be written by one screen. The driver clock is a signal indicating the reading timing of image data as already described with reference to FIG. 6. A driver output off signal is a signal for forcibly reducing a driver output to zero.

A driving voltage is input to the driver IC 10 in a way such that the logic voltage of 3 to 5V is raised by a booster unit 40, the raised voltage is formed into various types of voltage outputs by a voltage forming unit 50, and a voltage to be input to the driver IC 10 is selected by a voltage selection unit 60 from among the voltages formed by the voltage forming unit 40 based on control data output from the computation unit 20, and the selected voltage is input to the driver IC 10 via a regulator 70.

A preferred embodiment of a reflective liquid crystal display element according to the present invention is described next with reference to the attached drawings, and a liquid crystal composition according to the present invention is specifically described.

Figure 9:
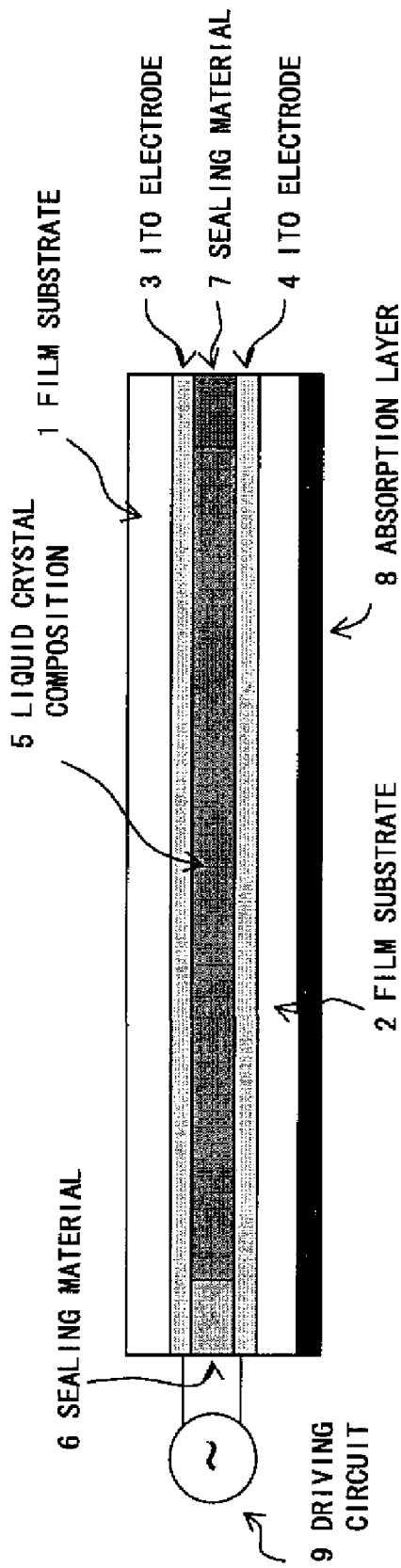
FIG. 9 shows the cross section of one example of a display element.

FIG. 9 shows the cross section of the structure of the preferred embodiment of the liquid crystal display element to which the driving method according to the present invention is applied. This liquid crystal display element has a memory property, and its planar state and focal conic state are maintained even after the application of a pulse voltage is stopped. The liquid crystal display element includes a liquid crystal composition 5 between electrodes. The electrodes 3 and 4 are faced to mutually intersect when viewed from a direction vertical to substrates. An electrode driven by the scan driver shown in FIG. 4 is a scan electrode, whereas an electrode driven by the data driver is a data electrode. Preferably, an insulative thin film or an orientation stability film is coated on the electrodes. Additionally, on an outer surface (back) of a substrate on a side opposite to the side to which light is incident, a visible light absorption layer 8 is provided depending on need.

In the liquid crystal display element according to the present invention, the numeral 5 denotes a cholesteric liquid crystal composition that presents a cholesteric phase at room temperature. Materials and combinations of the materials for this composition are specifically explained below on the basis of experiments.

The numerals 6 and 7 denote sealing materials. The sealing materials 6 and 7 are for sealing the liquid crystal composition 5 between substrates 1 and 2. The numeral 9 denotes a driving circuit for applying a prescribed pulse voltage to the electrodes.

The substrates 1 and 2 are both transparent, but in the present invention, at least one of the substrates that constitute a pair has to be transparent. As a transparent substrate used in the present invention, a glass substrate can be used, but a film substrate such as PET, PC or the like can also be used.

For the electrodes 3 and 4, Indium Tin Oxide (ITO) can be used as a representative example. However, a transparent conductive film such as a film of Indium Zinc Oxide (IZO) or the like, a metal electrode such as an electrode of aluminum, silicon or the like, and a photoconductive film such as a film of amorphous silicon, BSO (Bismuth Silicon Oxide) or the like can be used. In the liquid crystal display element shown in FIG. 9, a plurality of belt shaped transparent electrodes 3 and 4 that are parallel to each other are formed on the surfaces of the transparent substrates 1 and 2, and these electrodes face each other in such a manner that they cross each other when viewed from the direction orthogonal to the substrate.

Next, preferred factors that can be applied to the liquid crystal display element according to the present invention are explained, although this is not shown in FIG. 9.

(Insulative Thin Film)

The liquid crystal display elements according to the present invention (including the liquid crystal display element shown in FIG. 9) may include an insulative thin film that functions to prevent short circuits between electrodes and serves as a gas-barrier layer so as to improve the reliability of liquid crystal display elements.

(Orientation Stability Film)

Examples for the orientation stability film are organic films such as films of polyimide resin, polyamide-imide resin, polyetherimide resin, Poly(vinyl butyral) resin, akryl resin or the like and inorganic materials such as oxide silicon, oxidized aluminum or the like. In the present embodiment, the electrodes 3 and 4 are coated with orientation stability films. Also, orientation stability films can be used as insulative thin films.

(Spacer)

The liquid crystal display elements according to the present invention (including the liquid crystal display element shown in FIG. 9) may include spacers between a pair of substrates in order to keep the gap between the substrates constant.

In the liquid crystal display element according to the present embodiment, spacers are provided between the substrates 1 and 2. An example of a spacer that can be used here is a ball made of resin or inorganic oxide. Alternately, a fixation spacer with thermoplastic resin coated thereon can be used.

Next, the liquid crystal composition is explained. The liquid crystal composition that constitutes the liquid crystal layers is a cholesteric liquid crystal that is obtained by adding 10 wt % through 40 wt % of a chiral agent to a nematic liquid crystal mixture. The amount of the added chiral agent is the amount that the total amount of the nematic liquid crystal component and the chiral agent is 100 w %.

Various types of conventional nematic liquid crystals can be used. However, it is desirable to use liquid crystals having a dielectric anisotropy of 20 or higher in view of driving voltage. If the dielectric anisotropy is 20 or higher, the driving voltage can be reduced to a relatively lower value. It is desirable for the dielectric anisotropy ($\Delta\epsilon$) of the cholesteric liquid crystal composition to be between 20 and 50.

Also, it is desirable for the refraction index anisotropy ($\Delta n$) to be between 0.18 and 0.24. If the refraction index anisotropy is lower than this range, the reflection factor in the planar state decreases, and if the refraction index anisotropy is higher than this range, the scatter reflections in the focal conic state increase, and the viscosity also increases, which decreases the response speed.

It is desirable that the thickness of this liquid crystal be in the range from 3 μm through 6 μm. If the thickness is less than this range, the reflection factor in the planar state decreases, and if the thickness is greater than this range, the driving voltage becomes too high.

Next, an experimental example according to the present invention is explained in which a display element with eight gray scale levels in monochrome and with a Q-VGA resolution was produced and used.

Liquid crystals display green in the planar state, and display black in the focal conic state.

As driver ICs, two devices having the product number S1D17A03 (with 160 outputs) and one device having the product number S1D17A04 (with 240 outputs) were used, all of which are general purpose STN drivers manufactured by EPSON CO. The driving circuit was set in such a manner that the 320 outputs were the data side and the 240 ouputs were the scanning side. In the above setting process, the voltage input to the driver may be stabilized by using a voltage follower of an operational amplifier if necessary.

Voltages input to this driver IC are similar to those shown in FIG. 2B. As shown in FIG. 2C, the pulse voltages of ±32V and ±24V are stably applied to ON and OFF pixels respectively, and the pulse voltage of ±4V is applied to a nonselected pixel.

A partial rewrite region is scanned at a speed of approximately 3 ms/line, and a nontargeted region is momentarily scanned at a scanning speed of a level of several to several tens of μs/line. To all of pixels of the nontargeted region, the voltage of ±24V is applied. However, crosstalk does not occur due to high speed, and a displayed image is maintained. In the partial rewrite region, the display is newly updated due to a predetermined scanning speed.

The present invention is applicable also to a display material having a memory property other than cholesteric liquid crystal, and more preferably applicable, especially, to one type of liquid crystal.

As described above, with the method of driving a display element using cholesteric liquid crystal according to the present invention, a partial screen can be rewritten with an inexpensive universal driver, whereby a large effect can be produced by applying the method to electronic paper, etc.

What is claimed is:

1. A method of driving a display element that has a plurality of scan electrodes and a plurality of data electrodes, both of those electrodes facing so as to mutually intersect, wherein applying a pulsed driving voltage with a driver IC while selecting the plurality of scan electrodes in an order, comprising:
    scanning a first region to be partially rewritten at a first speed; and
    scanning a second region other than the first region at a second speed which is faster than the first speed and at which crosstalk does not occur.

2. The method of driving a display element according to claim 1, wherein
    a voltage output of the driver IC is unipolar.

3. The method of driving a display element according to claim 1, wherein
    a universal STN driver of two-valued output is used as the driver IC, the plurality of scan electrodes are used as common mode, and the plurality of data electrodes are used as segment mode.

4. The method of driving a display element according to claim 1, wherein
    a voltage output at the time of a partial rewrite is held even while the second region is being scanned.

5. The method of driving a display element according to claim 1, wherein
    if an existing display state is held locally in the first region, an image for the rewrite and an image to be held are combined before image data is input to the driver IC.

6. The method of driving a display element according to claim 1, wherein
    the display element makes a display by using a reflection material having a memory property.

7. The method of driving a display element according to claim 6, wherein
    a liquid crystal forming a cholesteric phase is used as the reflection material.

8. A display element that has a plurality of scan electrodes and a plurality of data electrodes, both of those electrodes facing so as to mutually intersect, and that applies a pulsed driving voltage with a driver IC while selecting the plurality of scan electrodes in an order, comprising:
    an unit of scanning a first region to be partially rewritten a first speed, and scanning a second region at a second speed which is faster than the first speed and at which crosstalk does not occur.

9. The display element according to claim 8, wherein
    a voltage output of the driver IC is unipolar.

10. The display element according to claim 8, wherein
    a voltage output at the time of a partial rewrite is held even while the second region is being scanned.

11. The display element according to claim 8, wherein
if an existing display state is held locally in the first region, an image for the rewrite and an image to be held are combined before image data is input to the driver IC.

12. The display element according to one of claim 8, wherein
the display element makes a display by using a reflection material having a memory property.

13. The display element according to claim 12, wherein
liquid crystal forming a cholesteric phase is used as the reflection material.

14. An electronic terminal comprising the display element according to claim 8.

15. The display element according to claim 14, wherein
a voltage output of the driver IC is unipolar.

16. The display element according to claim 14, wherein
a voltage output at the time of a partial rewrite is held even while the second region is being scanned.

17. The display element according to claim 14, wherein if an existing display state is held locally in the first region, an image for the rewrite and an image to be held are combined before image data is input to the driver IC.

18. The display element according to claim 14, wherein
the display element makes a display by using a reflection material having a memory property.

19. The display element according to claim 18, wherein
a liquid crystal forming a cholesteric phase is used as the reflection material.

* * * * *